US009608951B2

(12) United States Patent
Febonio et al.

(10) Patent No.: US 9,608,951 B2
(45) Date of Patent: Mar. 28, 2017

(54) DISPLAYING A KNOWN SENDER'S IDENTIFIER TO A RECIPIENT OF A JOINT SENDERS' MESSAGE

(71) Applicant: International Business Machines Corporation, Armonk, NY (US)

(72) Inventors: Barbara Febonio, Rome (IT); Sandro Piccinini, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 13/751,058

(22) Filed: Jan. 26, 2013

(65) Prior Publication Data
US 2013/0138754 A1    May 30, 2013

Related U.S. Application Data

(62) Division of application No. 12/984,687, filed on Jan. 5, 2011, now abandoned.

(51) Int. Cl.
*H04L 12/58* (2006.01)
*G06Q 10/10* (2012.01)
*H04L 29/06* (2006.01)

(52) U.S. Cl.
CPC .......... *H04L 51/12* (2013.01); *G06Q 10/101* (2013.01); *G06Q 10/107* (2013.01); *H04L 51/04* (2013.01); *H04L 63/101* (2013.01)

(58) Field of Classification Search
CPC ...... G06Q 10/00; G06Q 10/10; G06Q 10/101; G06Q 10/103; G06Q 10/107; H04L 51/00;

(Continued)

(56) References Cited

U.S. PATENT DOCUMENTS 5,872,925 A     2/1999   Han ............................. 709/206
6,978,366 B1 *  12/2005  Ignatchenko ....... G06F 21/6218
                                                      713/165

(Continued)

OTHER PUBLICATIONS

Notice of Allowance for U.S. Appl. No. 12/984,687 (Febonio et al.,"Displaying a Known Sender's Identifier to a Recipient of a Joint Senders' Message," filed Jan. 5, 2011 ), U.S. Patent and Trademark Office, mailed Dec. 13, 2013, 18 pages.

(Continued)

*Primary Examiner* — Jung Kim
*Assistant Examiner* — Adrian Stoica
(74) *Attorney, Agent, or Firm* — VanLeeuwen & VanLeeuwen; Richard A. Wilhelm

(57) ABSTRACT

An approach is provided in which a request is received from a requestor to send a new email message to one or more recipients on behalf of a selected joint sender group (JSG). The selected JSG includes multiple JSG members with one of the JSG members being the requestor. Permissions corresponding to the JSG are then retrieved and compared to the requestor and the contents of the new email message are identified. The new email message is then sent to the recipients in response to determining, based on the comparison, that the requestor has permission to send the new email message on behalf of the selected JSG. On the other hand, the sending of the new email message is inhibited in response to determining that the requestor lacks permission to send the new email message on behalf of the selected JSG.

6 Claims, 9 Drawing Sheets

(58) Field of Classification Search
CPC ......... H04L 51/04; H04L 51/08; H04L 51/12; H04L 51/14; H04L 9/00; H04L 9/32; H04L 9/3247; H04L 9/3249; H04L 9/3252; H04L 9/3255; H04L 9/3263; H04L 63/00; H04L 63/08; H04L 63/0823; H04L 63/10; H04L 63/101; H04L 63/104; H04L 63/105; H04L 63/12; H04L 63/123; H04L 63/126; G06F 21/00; G06F 21/60; G06F 21/604; G06F 21/62; G06F 21/6209; G06F 21/6218; G06F 21/64

See application file for complete search history.

(56) References Cited

U.S. PATENT DOCUMENTS

| | | | |
|---|---|---|---|
| 7,437,421 B2 | 10/2008 | Bhogal et al. | 709/206 |
| 8,132,261 B1 * | 3/2012 | Simpson | G06F 21/6218 726/2 |
| 8,166,565 B1 * | 4/2012 | Tormasov | G06Q 10/101 380/277 |
| 2003/0188167 A1 * | 10/2003 | Kurosaki et al. | 713/176 |
| 2006/0277263 A1 | 12/2006 | Daniels et al. | 709/206 |
| 2008/0052364 A1 | 2/2008 | Zhou | 709/206 |
| 2009/0138557 A1 | 5/2009 | Lyle et al. | 709/206 |
| 2009/0222887 A1 | 9/2009 | Cohen | |
| 2009/0282493 A1 * | 11/2009 | Bhide | H04L 63/105 726/28 |
| 2010/0043070 A1 * | 2/2010 | Okada | G06F 21/6209 726/21 |
| 2010/0046749 A1 * | 2/2010 | Hatano | H04L 9/088 380/44 |

OTHER PUBLICATIONS

Office Action for U.S. Appl. No. 12/984,687 (Febonio et al.,"Displaying a Known Sender's Identifier to a Recipient of a Joint Senders' Message," filed Jan. 5, 2011 ), U.S. Patent and Trademark Office, mailed Jun. 28, 2013, 9 pages.

* cited by examiner

US 9,608,951 B2

DISPLAYING A KNOWN SENDER'S IDENTIFIER TO A RECIPIENT OF A JOINT SENDERS' MESSAGE

TECHNICAL FIELD

The present invention relates to sending email messages that originate from a joint sender group. More particularly, the present invention relates to identifying individual group members and including the members in a joint sender group.

BACKGROUND OF THE INVENTION

The currently available mailing services are rapidly changing since people are leveraging them more and more, for work and for fun, from a great variety of devices, and above all within groups and communities. For security reasons, individuals will often not open email from individuals they do not recognize, or will treat such emails as lower priority items. Current mailing systems have limitations when dealing with sender identity issues. Delegation of mail is currently available to send mail to another person. All addresses of the delegated email receive the mail as it was sent by the delegator, and inside the mail there will be the reference to the person who actually sent the mail. Furthermore, if two friends or colleagues decide to send a joint email and the addressees do not know both of the senders the email will often be overlooked. For example, if two people are going to marry each other and want to send an email regarding the wedding to their colleagues, they would want to have people who only know the bridegroom to see the mail as it was sent by him, and people who only know the bride to see the same mail as it was sent by her, often necessitating two email chains to accomplish the task. Similar examples can be readily found in business collaboration scenarios.

SUMMARY

An approach is provided in which a request is received from a requestor to send a new email message to one or more recipients on behalf of a selected joint sender group (JSG). The selected JSG includes multiple JSG members with one of the JSG members being the requestor. Permissions corresponding to the JSG are then retrieved and compared to the requestor and the contents of the new email message are identified. The new email message is then sent to the recipients in response to determining, based on the comparison, that the requestor has permission to send the new email message on behalf of the selected JSG. On the other hand, the sending of the new email message is inhibited in response to determining that the requestor lacks permission to send the new email message on behalf of the selected JSG. Another approach is provided to receive JSG messages. In this approach, a JSG message is received at a recipient from a member of a joint sender group (JSG). The email message includes a signed JSG file which is validated using one or more public keys associated with the signed JSG file. The received JSG message contents is displayed along with a JSG name in response to a successful validation by the selected recipient of the received new email message.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
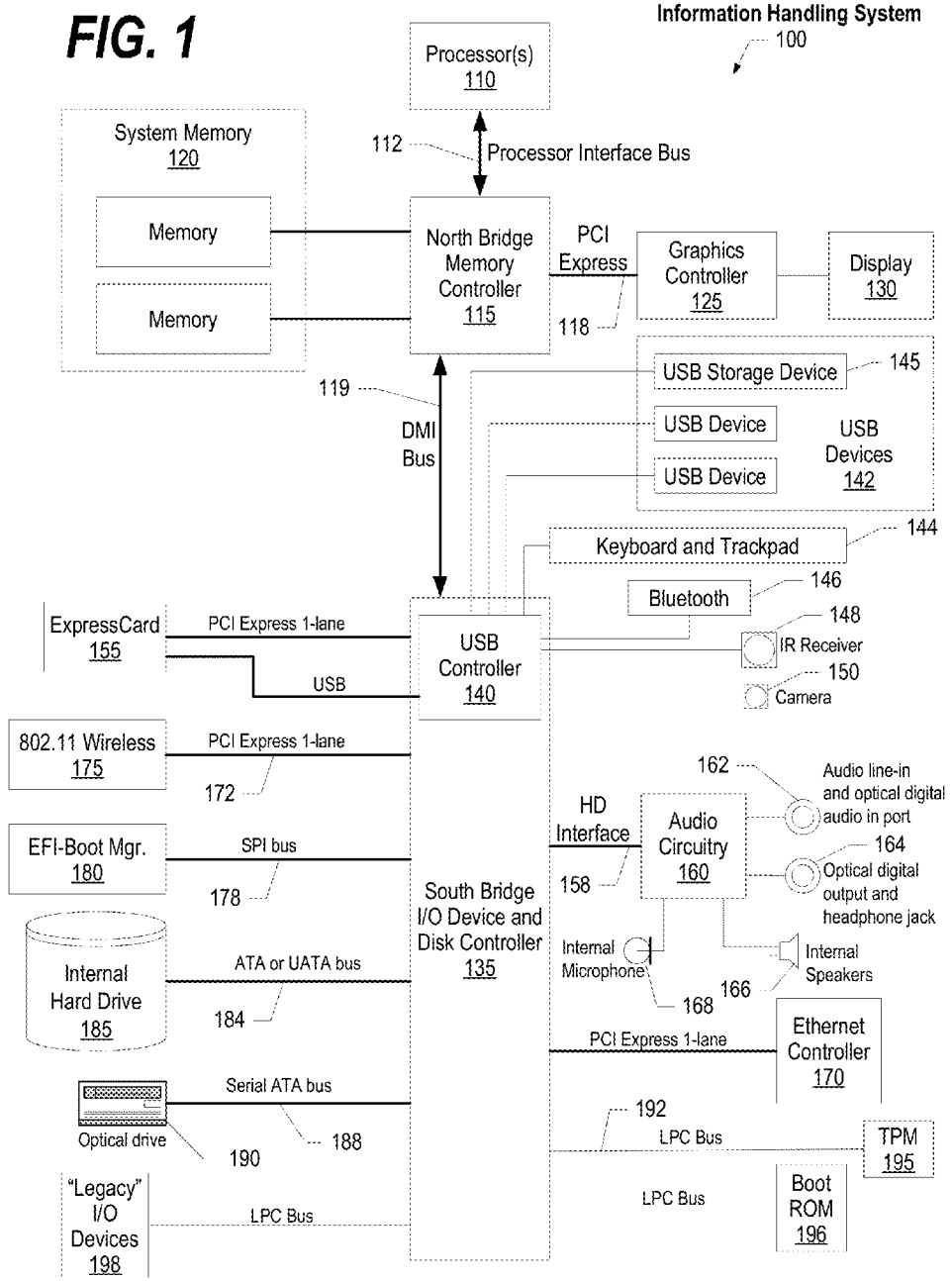
FIG. 1 is a block diagram of a data processing system in which the methods described herein can be implemented.
Figure 2:
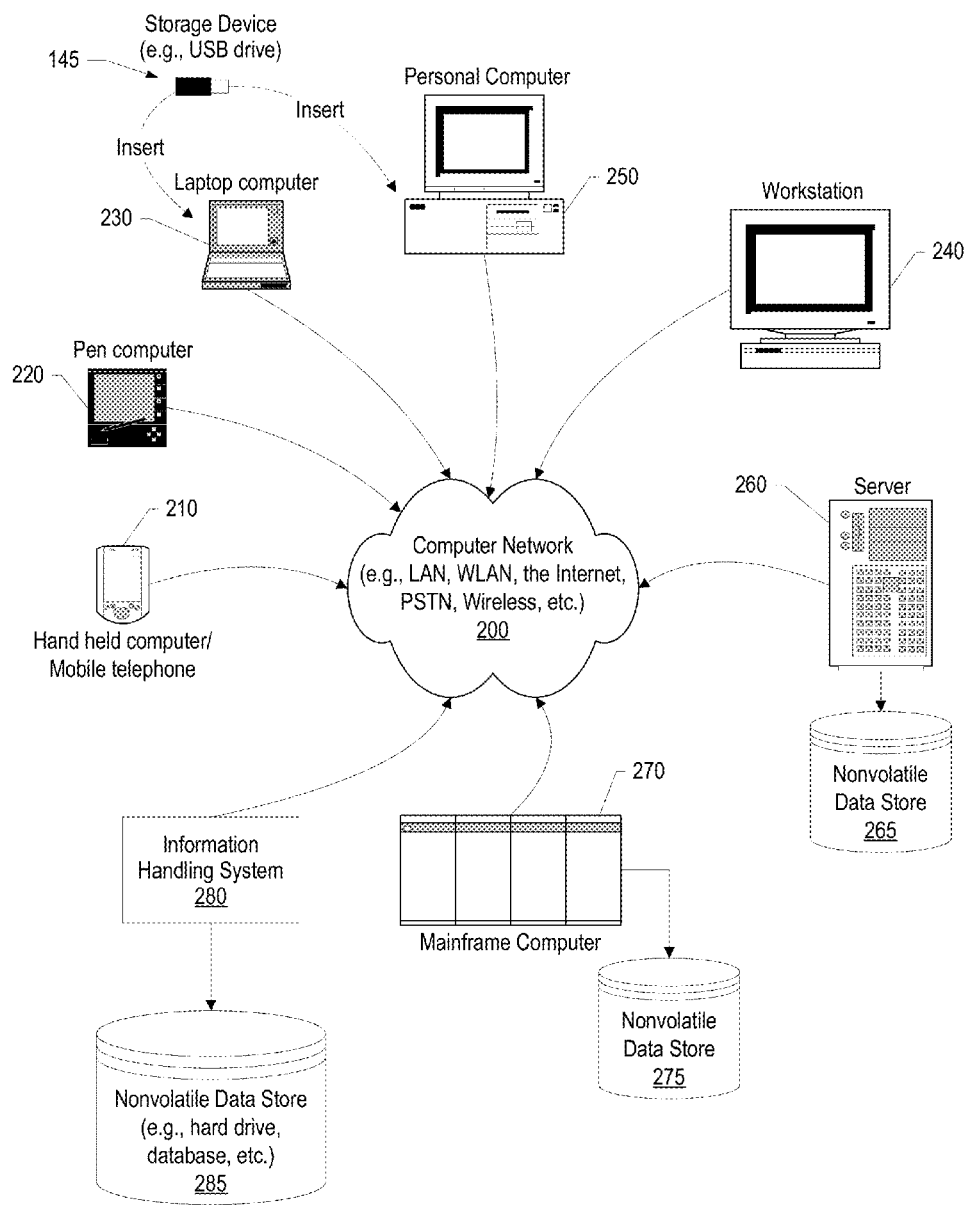
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
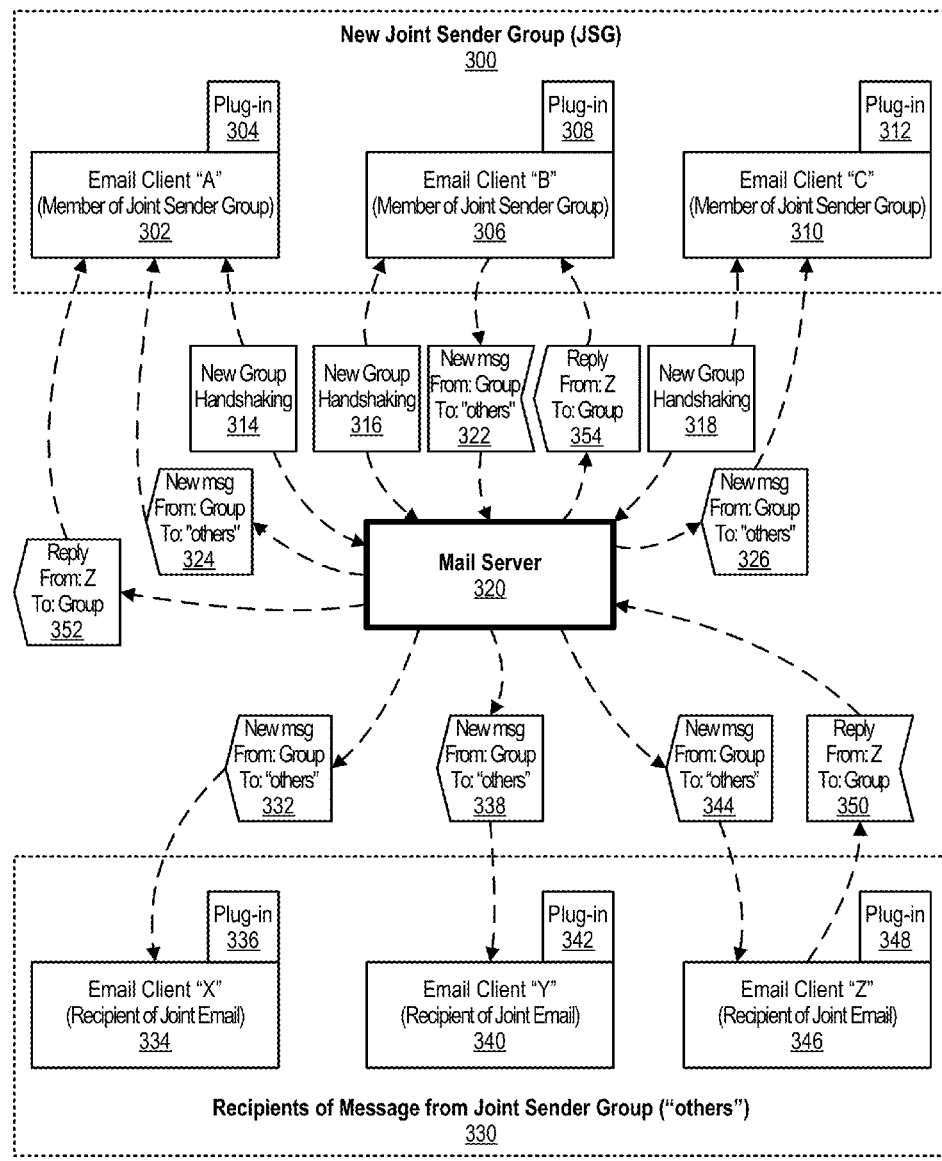
FIG. 3 is a diagram showing flows between members of a joint sender group and recipients of email from the joint sender group.

FIG. 3 is a diagram showing flows between members of a joint sender group and recipients of email from the joint sender group. New joint sender group (JSG) 300 includes a group of members each with particular permissions associated with the JSG. The JSG may be formed for a variety of reasons, such as individuals on a team that send periodic reports to others, and the like. In the example shown, there are three members of the new JSG—member "A" (302), member "B" (306), and member "C" (310). In one embodiment, an email plug-in component is installed for both members of the JSG as well as other users that may receive email originating from the JSG. The installed plug-in for the members are plug-ins 304, 308, and 312, respectively. Standard email server 320 handles the transmission of email messages between members and between members and other recipients.

A new JSG is created by a creator who is typically one of the JSG members. The JSG creator selects the members of the JSG, the name of the JSG, as well as the permissions that will be assigned to each of the JSG members. A handshaking process is then used between the JSG creator and the other members of the JSG in order to form and finalize the JSG. For example, if member "A" (302) is the JSG creator, then member "A" would send new group handshaking data 314 to members "B" (306) and "C" (310) which would be received as new handshaking data 316 and 318, respectively. The other members ("B" and "C") of the JSG would send acknowledgements back to the creator (member "A") notifying the creator that the members accept their positions in the new JSG. As previously mentioned, permissions can be assigned so that, for example, only certain members can send new email on behalf of the JSG. Other permissions can also be established to determine which members receive "reply" messages originating from recipients of a JSG message.

After the new JSG has been established, those members with sufficient permissions can initiate a new email message on behalf of the group (the JSG). For example, member "B" (306) can send new email message 322 to one or more recipients 330. Note that, in the example, recipients 330 is shown including three recipients (recipient "X" (334), recipient "Y" (340), and recipient "Z" (346)) and that all of these recipients have email clients with the plug-in software installed (plug-ins 336, 342, and 348, respectively). The new email message is received by the recipients as new email message 332, 338, and 344, respectively. The plug-in component operates to identify the name of the JSG (rather than the actual, individual sender) as the "sender" of the new email message. In addition, as explained in further detail herein, the plug-in component also validates the JSG file to ensure that the JSG message was not sent by an imposter.

One or more of recipients 330 may choose to "reply" to the received JSG email message. In the example shown, recipient "Z" (346) replies to the received JSG email message with reply message 350. The plug-in operates to analyze the JSG file and identify the actual individuals included in the JSG that have permissions to receive reply emails. In the example shown, the reply sent by recipient "Z" is transmitted back to members "A' (reply message 352) and "B" (reply message 354) but is not transmitted back to member "C" (310) as this member evidently does not have sufficient permissions to receive reply emails when someone replies to message sent by a member of this particular JSG. For example, perhaps member "C" is an administrative assistant that works with members "A" and "B" who are managers in an organization. Because the reply message may include sensitive content, the JSG creator may have decided to inhibit reply messages being returned to the administrative assistant.

Figure 4:
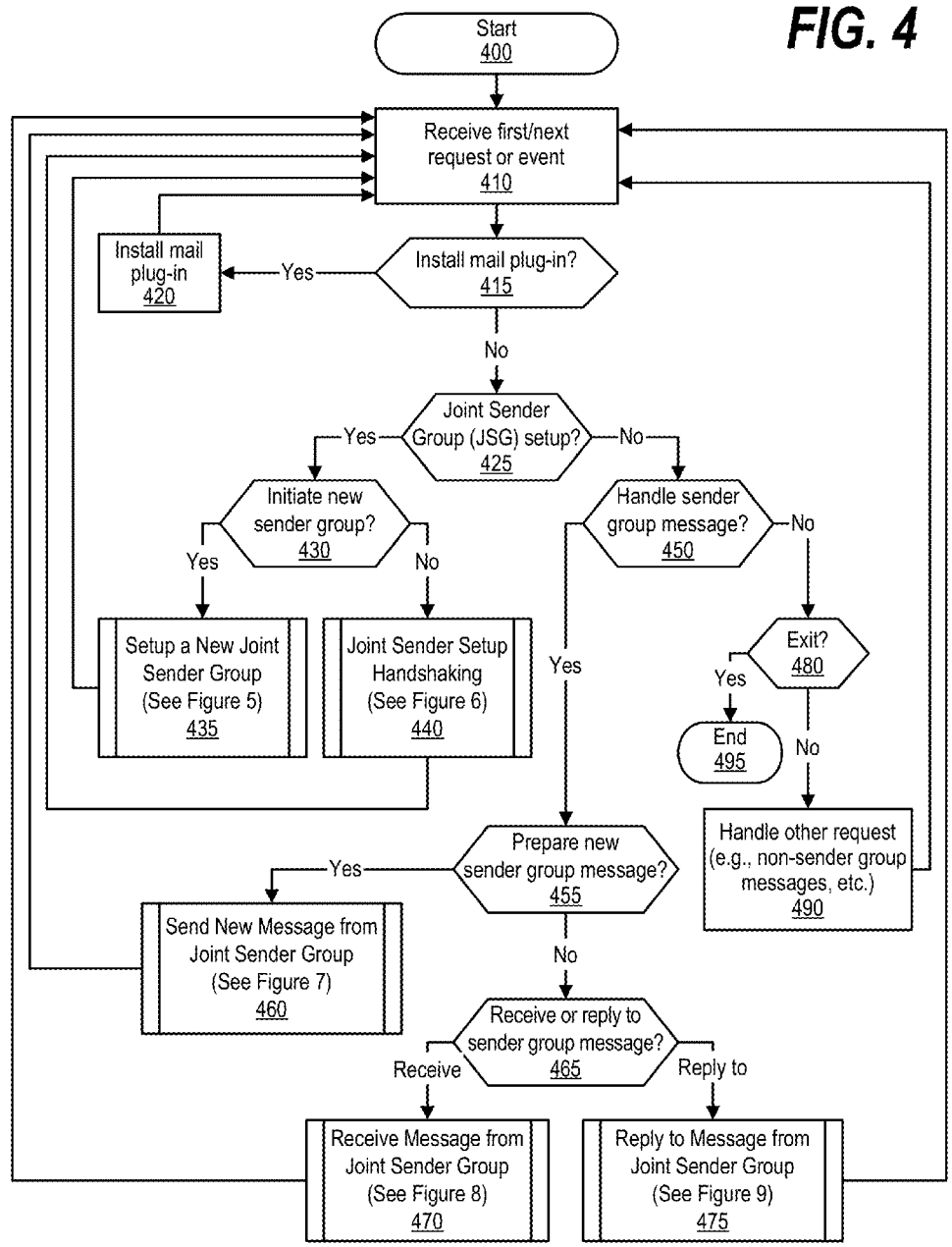
FIG. 4 is a high level flowchart showing steps performed using joint sender groups.

FIG. 4 is a high level flowchart showing steps performed using joint sender groups. Processing commences at 400 whereupon, at step 410 the first request or event is received. A decision is made as to whether the request is to install the plug-in software used to work with joint sender group (JSG) files (decision 415). If the request is to install the plug-in, then decision 415 branches to the "yes" branch whereupon, at step 420, the JSG plug-in software is installed and processing loops back to receive the next request or event.

On the other hand, if the request is not to install the JSG plug-in software, then decision 415 branches to the "no" branch whereupon a decision is made as to whether the request is related to setting up a new JSG (decision 425). If the request is related to setting up a new JSG, then decision 425 branches to the "yes" branch whereupon a decision is made as to whether the request is to initiate a new JSG by a creator or, instead, the request is part of the JSG handshaking used to confirm JSG membership and finalize the JSG (decision 430). If the request is to initiate (create) a new JSG by the creator of a new JSG, then decision 430 branches to the "yes" branch whereupon, at predefined process 435, new JSG setup processing is performed (see FIG. 5 and corresponding text for processing details). On the other hand, if the request is part of the handshaking process, then decision 430 branches to the "no" branch whereupon, at predefined process 440, JSG handshaking processing is performed (see FIG. 6 and corresponding text for processing details). Processing then loops back to receive the next request or event.

Returning to decision 425, if the request is not related to setting up a new JSG, then decision 425 branches to the "no" branch whereupon a decision is made as to whether the request is related to handling a JSG message (decision 450). If the request is to handle a JSG message, then decision 450 branches to the "yes" branch whereupon a decision is made as to whether the request is to prepare a new JSG message (decision 455). If the request is to prepare a new JSG message, then decision 455 branches to the "yes" branch whereupon, at predefined process 460, the new JSG message process is performed to send a new JSG message (see FIG. 7 and corresponding text for processing details). On the other hand, if the request is not to send a new JSG message, then decision 455 branches to the "no" branch whereupon a decision is made as to whether the request is to "receive a JSG message" or "reply to a JSG message" (decision 465). If the request is to "receive a JSG message", then decision 465 branches to the "receive" branch whereupon, at predefined process 470, the JSG message is received (see FIG. 8 and corresponding text for processing details). On the other hand, if the request is to "reply to a JSG message", then decision 465 branches to the "reply to" branch whereupon, at predefined process 475, a routine used to reply to JSG messages is executed (see FIG. 9 and corresponding text for processing details).

Returning to decision 450, if the request is not to handle a JSG message, then decision 450 branches to the "no"

branch whereupon a decision is made as to whether the request is to exit the email program (decision 480). If the request is not to exit, then decision 480 branches to the "no" branch whereupon some other type of request is handled (e.g., handle a non-JSG message, etc.). On the other hand, when the user requests to exit the email program, then decision 480 branches to the "yes" branch whereupon processing ends at 495.

Figure 5:
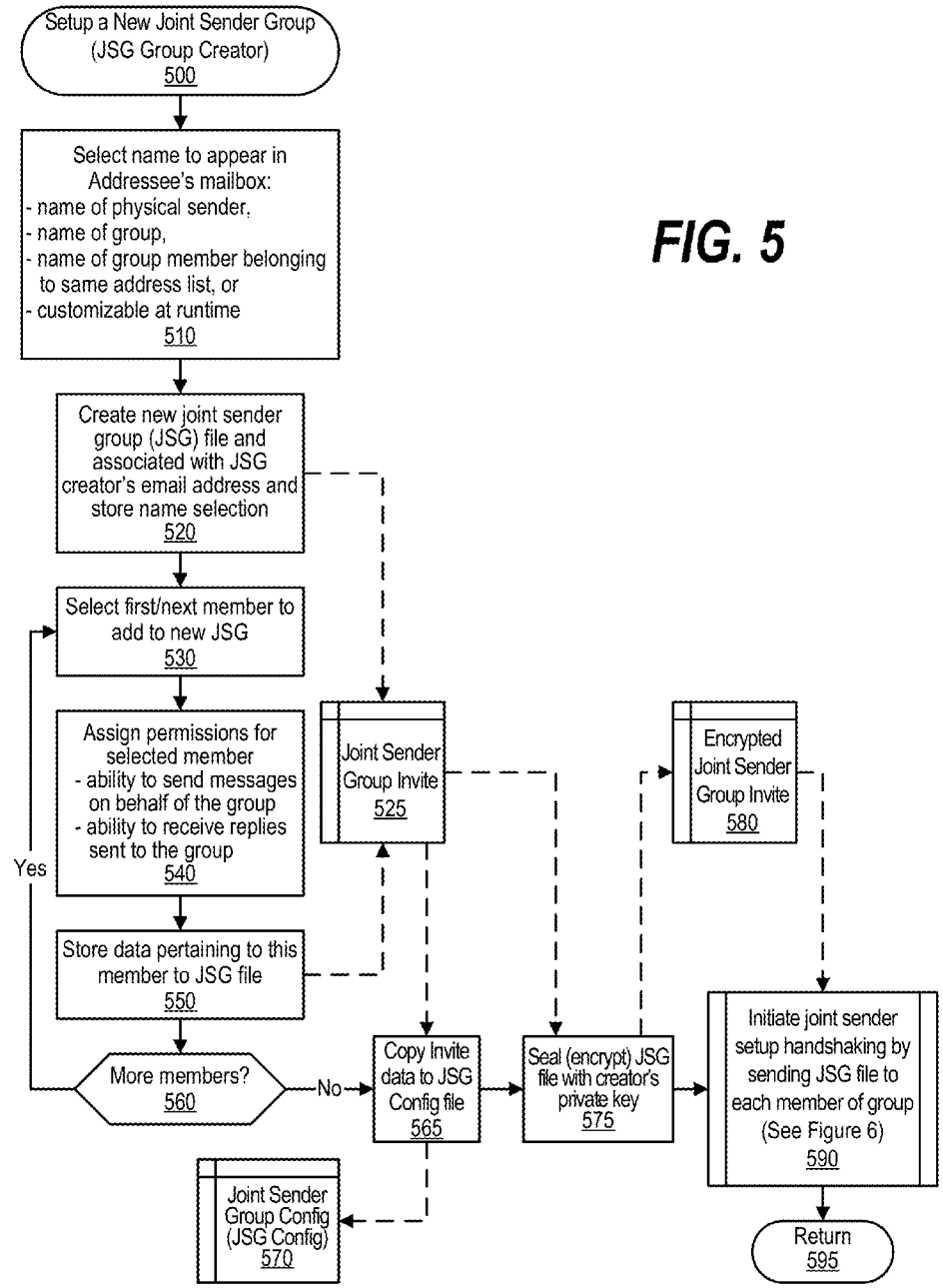
FIG. 5 is a flowchart showing steps taken by a creator to setup a new joint sender group.

FIG. 5 is a flowchart showing steps taken by a creator to setup a new joint sender group. Processing commences at 500 whereupon, at step 510, the creator of the new joint sender group (JSG) selects a name (the JSG name) that will appear in the recipient's email mailbox. Various names can be selected to appear, such as the name of the physical sender of the email, the name of the group (e.g., "Managers," etc.), the name of a JSG group member that belongs to the same address list, or allow the name to be customizable so that at runtime the name is chosen by the JSG message sender.

At step 520, JSG invitation file 525 is created and the new file is associated with the JSG creator that is creating the group. At step 530, the JSG creator selects the first member (JSG member) to include (add to) the new JSG. At step 540, the JSG creator assigns various permissions to the selected JSG member. These permissions may include the ability of the selected JSG member to send JSG email messages on behalf of the JSG, and the ability of the selected JSG member to receive replies directed from a recipient of a JSG message back to the JSG. At step 550, the selected JSG member and the permissions assigned to the selected member are stored in JSG invitation file 525. A decision is made as to whether there are more members to include in the new JSG (decision 560). If there are more members to include, then decision 560 branches to the "yes" branch which loops back to receive the next JSG member selection and permissions to assign to the next member. This looping continues until there are no more members to include in the JSG invitation file, at which point decision 560 branches to the "no" branch for further processing.

At step 565, the data from JSG invitation file 525 is copied to JSG configuration file 570. At step 575, JSG invitation file 525 is signed (encrypted) using the creator's private key resulting in encrypted JSG invitation file 580. At predefined process 590, the JSG creator initiates a handshaking process with each of the members included in the JSG invitation file by sending encrypted JSG invitation 580 to each of the JSG members (see FIG. 6 and corresponding text for processing details). Processing then returns to the calling routine (see FIG. 4) at 595.

Figure 6:
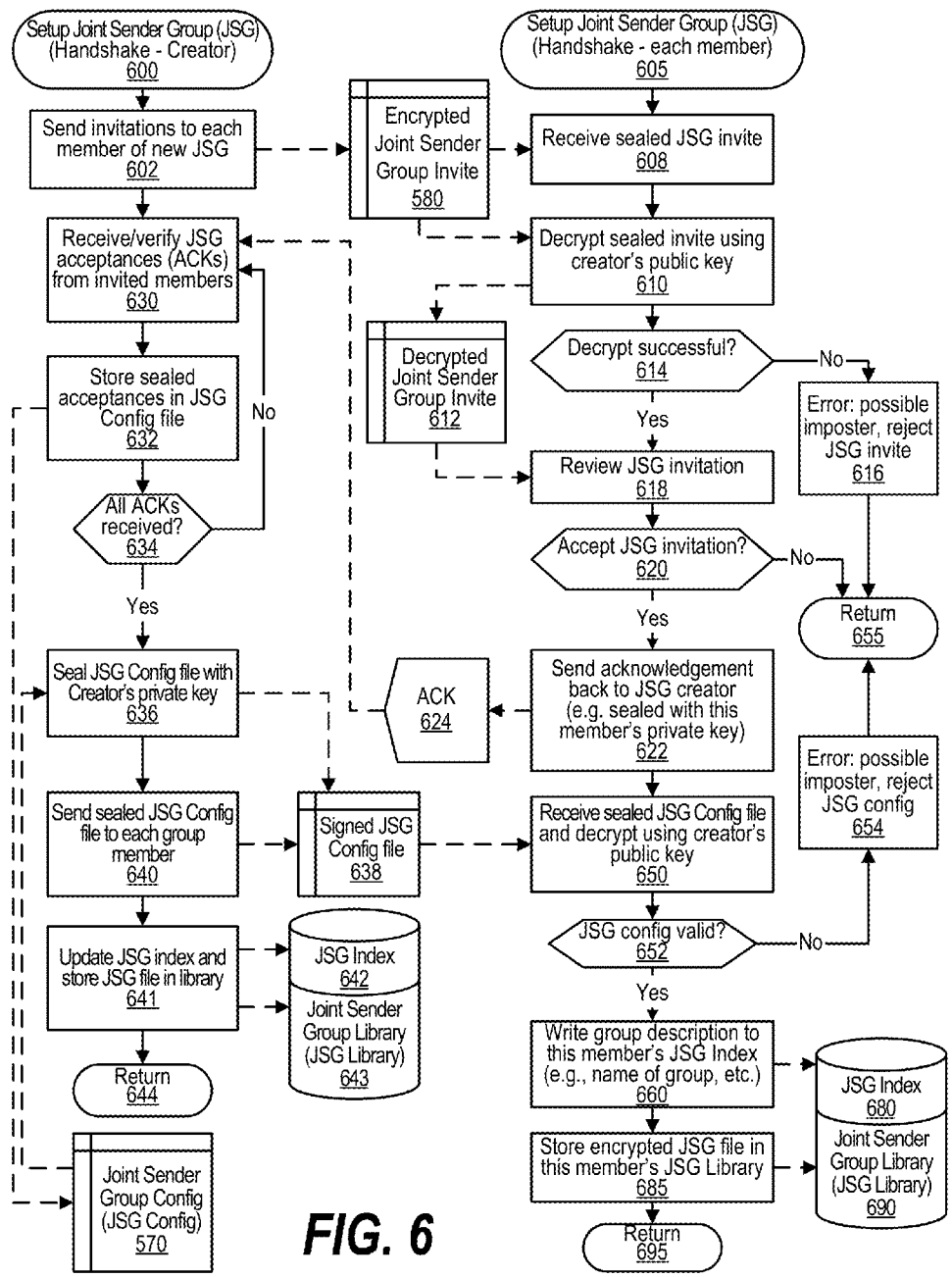
FIG. 6 is a flowchart showing handshaking steps performed between the creator and members of the joint sender group.

FIG. 6 is a flowchart showing handshaking steps performed between the creator and members of the joint sender group. Handshake processing is commenced by the JSG creator at 600 when, at step 602, the JSG creator sends encrypted JSG invitation file 580 inviting the members to join the new JSG. Handshaking processing performed by each member of the JSG is shown commencing at 605 where, at step 608, each member receives a digitally signed copy of the JSG invitation (the JSG invitation having previously been encrypted using the creator's private key). At step 610, the JSG member decrypts the signed JSG invitation using the sender's public key and a decision is made as to whether the decryption was successful, validating the JSG invitation (decision 614). If the decryption was unsuccessful, then decision 614 branches to the "no" branch whereupon, at step 616, an error occurs indicating a possible imposter regarding the JSG invitation and the JSG invitation is rejected. Processing then returns to the calling routine (see FIG. 4) at 655. On the other hand, if the decryption was successful, then decision 614 branches to the "yes" branch whereupon, at step 618, the member reviews the JSG invitation including the other members included in the JSG and the permissions (send, receive replies, etc.) assigned to each of the members. The JSG member then decides whether to accept the invitation to be part of the new JSG (decision 620). If the user decides to reject joining the JSG, then decision 620 branches to the "no" branch whereupon processing returns to the calling routine (see FIG. 4) at 655. On the other hand, if the JSG member chooses to join the JSG, then decision 620 branches to the "yes" branch whereupon, at step 622 the JSG sends a signed acknowledgement back to the JSG creator with acknowledgement 624 being signed (encrypted) using the JSG member's private key.

Processing returns to the creator of the JSG whereupon, at step 630, the creator receives the digitally signed acknowledgements from the JSG members. Also at step 630, the JSG creator verifies the acknowledgements by decrypting the signed acknowledgements using the respective JSG member's public encryption keys. At step 632 the signed acceptances are stored in JSG configuration file 570. A decision is made as to whether an acknowledgement has been received from each of the JSG members (decision 634). If all of the acknowledgements have not been received, then decision 634 branches to the "no" branch which loops back to continue receiving acknowledgements from the JSG members. When an acknowledgement has been received from each of the JSG members, then decision 634 branches to the "yes" branch for further processing.

At step 636, the JSG creator digitally signs JSG configuration file 570 and creates signed JSG configuration file 638. At step 640, the JSG creator sends a copy of the new (signed) JSG configuration file to each of the JSG members. At step 641, the creator stores the JSG configuration file in JSG library 643 and writes a group description to JSG index 642 so that the JSG configuration file can be subsequently retrieved and used by the JSG creator to send a JSG message. The creator's handshake processing then returns to the calling routine (see FIG. 5) at 644.

Returning to member handshake processing, at step 650, each member receives a copy of digitally signed JSG configuration file 638 and decrypts the file using the creator's public encryption key. A decision is made as to whether the JSG configuration file is valid (decision 652). If the file is not valid, then decision 652 branches to the "no" branch whereupon, at step 654, an error occurs indicating that the JSG configuration file was not validated and may have been sent by an imposter whereupon processing returns to the calling routine (see FIG. 4) at 655.

On the other hand, if the JSG configuration file is valid, then decision 652 branches to the "yes" branch whereupon, at step 660 a group description describing this JSG is written to JSG index 680. At step 685, the signed (encrypted) JSG configuration file is stored in the member's JSG library 690 so that it can be subsequently retrieved and used by the JSG member. The member's handshake processing then returns to the calling routine (see FIG. 4) at 695.

Figure 7:
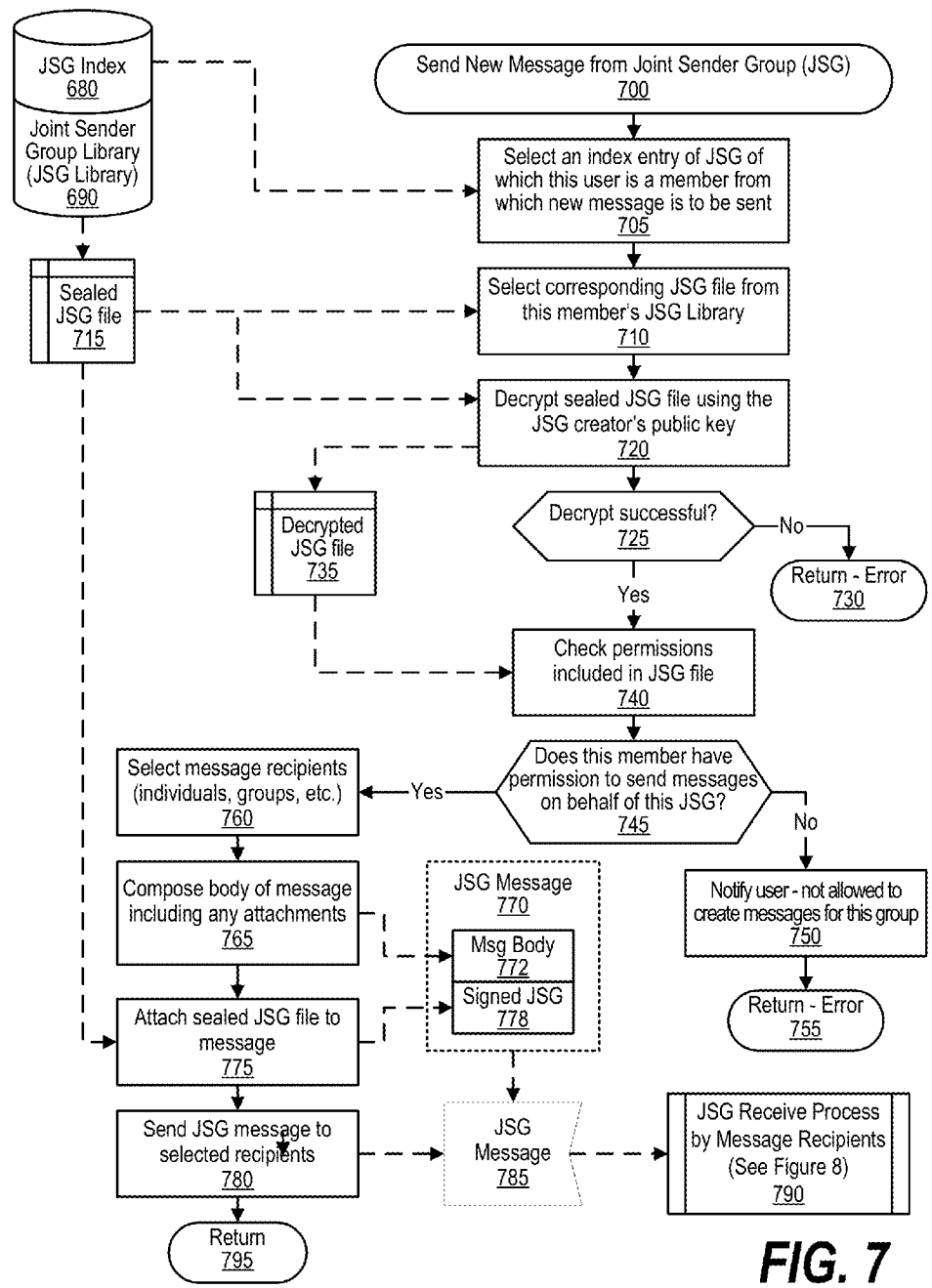
FIG. 7 is a flowchart showing steps performed to send a new email message from one of the joint sender group members.

FIG. 7 is a flowchart showing steps performed to send a new email message from one of the joint sender group members. In one embodiment, one or more of the steps outlined below is performed by the joint sender group (JSG) plug-in software module that handles processing of JSG files. Processing commences at 700 whereupon, at step 705, the user selects an index entry corresponding from JSG index 680 to one of the JSG configurations to which this user is a member. At step 710, the JSG configuration file corresponding to the selected index entry is retrieved from JSG library 690 and, at step 720, the selected JSG configuration file is validated by decrypting the signed JSG configuration file using the JSG creator's public encryption key and creating decrypted JSG configuration file 735. A decision is made as to whether the decryption (validation) of the selected JSG configuration file was successful (decision 725). If decryption of the selected JSG configuration file was not successful, then decision 725 branches to the "no" branch whereupon processing returns to the calling routine (see FIG. 4) at 730. On the other hand, if the decryption of the selected JSG configuration file was successful, then decision 725 branches to the "yes" branch whereupon, at step 740, the process checks the permissions stored in decrypted JSG configuration file 735.

After checking the permissions, a decision is made as to whether this JSG member has sufficient permission to send a new JSG message on behalf of the selected JSG (decision 745). If this JSG member does not have sufficient permission, then decision 745 branches to the "no" branch whereupon, at step 750, the user is notified that he/she is not allowed to create and send a message on behalf of this JSG. Processing then returns to the calling routine (see FIG. 4) at 755.

Returning to decision 745, if this JSG member has sufficient permission to send messages on behalf of the selected JSG, then decision 745 branches to the "yes" branch for further processing. At step 760, the JSG member selects the recipients (individuals, groups, etc.) that are to receive the new message from the selected JSG. At step 765, the user identifies contents of the message by composing text, including attachments, and the like. JSG message 770 is created with message body 772. In addition, at step 775, the signed JSG configuration file is attached (by the JSG plug-in) to JSG message 770 as signed JSG configuration file 778. Finally, at step 780, the JSG message (message 785) is sent to the selected recipients. Predefined process 790 shows the JSG receive process that is performed by the recipients of the JSG message (see FIG. 8 and corresponding text for processing details). The JSG message send process returns to the calling routine (see FIG. 4) at 795.

Figure 8:
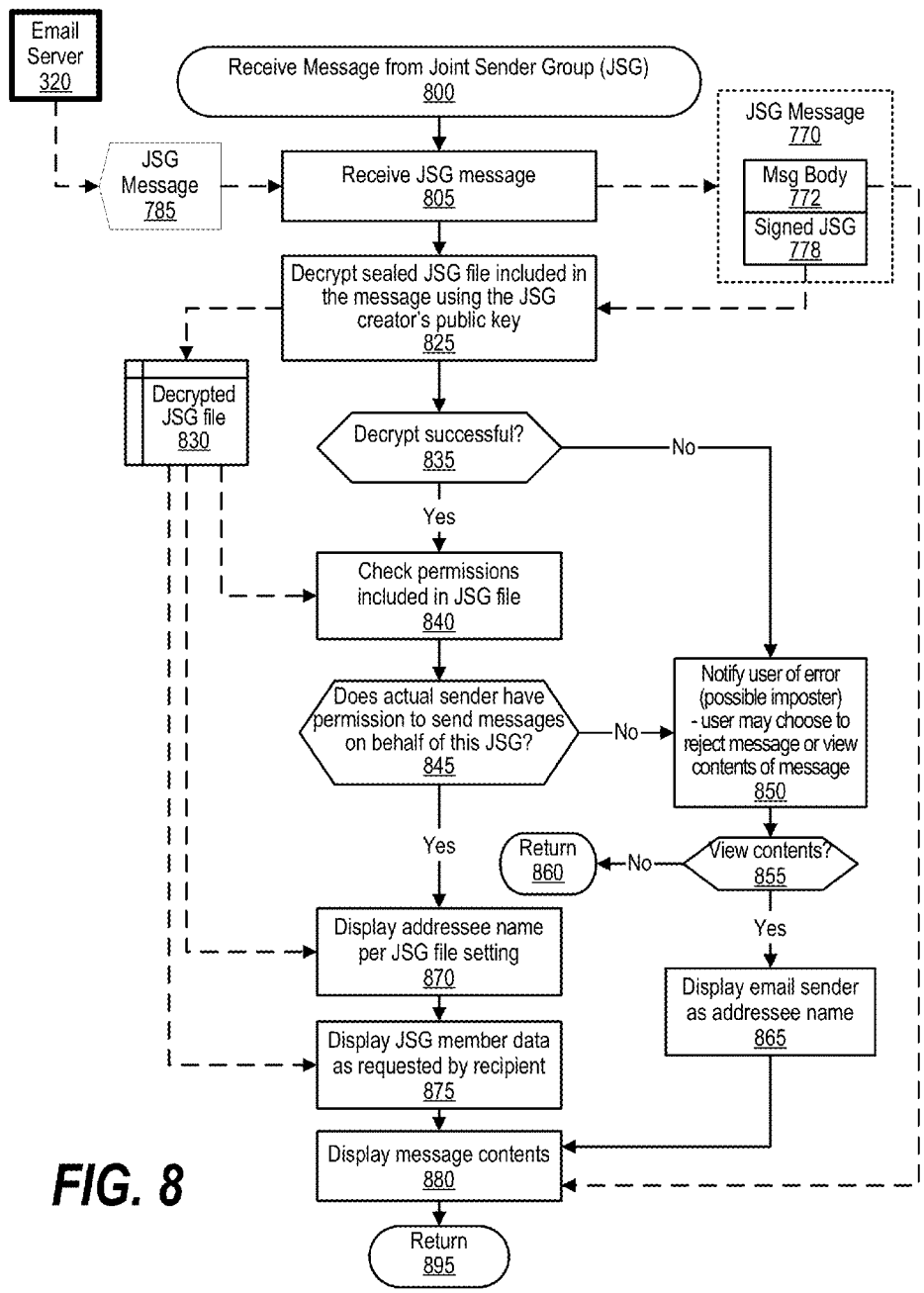
FIG. 8 is a flowchart showing steps performed by a receiver of a joint sender group message.

FIG. 8 is a flowchart showing steps performed by a receiver of a joint sender group message. In one embodiment, one or more of the steps outlined below is performed by the joint sender group (JSG) plug-in software module that handles the processing of JSG files. Processing commences at 800 whereupon, at step 805 the recipient receives JSG message 785 from a JSG member via email server 320. The received JSG message is stored as JSG message 770 and, as shown, the JSG message includes at least two parts: JSG message contents 772 and signed JSG configuration file 778.

At step 825, the recipient validates the receive message by decrypting signed JSG configuration file 778 using the JSG creator's public key which results in decrypted JSG configuration file 830. A decision is made as to whether the decryption (validation) of the signed JSG configuration file was successful (decision 835). If the decryption was successful, then decision 835 branches to the "yes" branch whereupon, at step 840, permissions are retrieved from the decrypted JSG configuration file and compared with the actual sender of the JSG message. A decision is made as to whether the actual sender of the JSG message has sufficient permission to send messages on behalf of the JSG (decision 845). If the actual sender of the message has sufficient permission to send messages on behalf of the JSG, then decision 845 branches to the "yes" branch for further processing. However, if either the decryption of the signed JSG configuration file was unsuccessful (decision 835 branching to the "no" branch) or the actual sender does not have sufficient permissions to send a JSG message on behalf of the group (decision 845 branching to the "no" branch), then, at step 850, the recipient is notified that the sender may be an imposter that is trying to send a JSG message on behalf of the group and the recipient can chose whether he or she wishes to view the contents of the message. A decision is made as to whether the recipient still wishes to view the contents of the message (decision 855). If the user does not wish to view the contents of the message, then decision 855 branches to the "no" branch whereupon processing returns to the calling routine (see FIG. 4) at 860. On the other hand, if the recipient chooses to view the contents, then decision 855 branches to the "yes" branch whereupon, at step 865 the actual sender of the email message is displayed as the addressee (sender) of the message and, at step 880, the contents of the message are displayed to the recipient.

Returning to decision 845, if the sender of the JSG message has permission to send the message, then decision 845 branches to the "yes" branch whereupon, at step 870, the addressee name (sender name) is displayed in the recipient's email box according to the JSG configuration file settings. For example, the JSG configuration file setting may indicate a particular group name (e.g., "Management", etc.) to display to recipients. In one embodiment, at step 875, the recipient is able to request to view details regarding the JSG configuration file, such as the actual members of the JSG, their respective permissions, etc. At step 880, the message contents of JSG message 770 are retrieved and displayed to the recipient. Processing returns to the calling routine (see FIG. 4) at 895.

Figure 9:
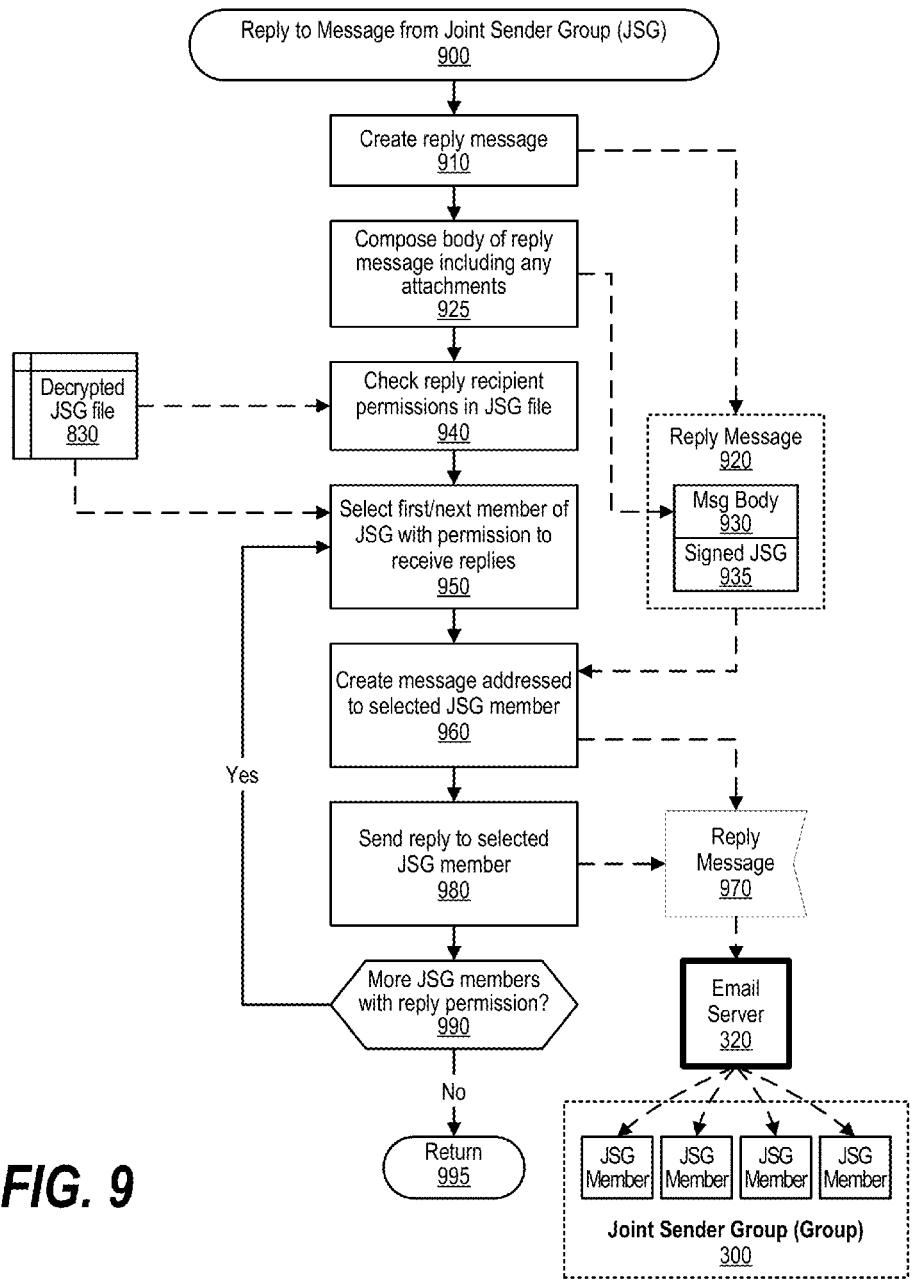
FIG. 9 is a flowchart showing steps performed to reply to a message received from a member of a joint sender group.

FIG. 9 is a flowchart showing steps performed to reply to a message received from a member of a joint sender group. Processing commences at 900 whereupon, at step 910, the recipient of a JSG message creates reply message 920 that includes message body (content) 930 as well as a copy of signed JSG configuration file 935. When the recipient requests to send reply message 920, the reply permissions are retrieved from decrypted JSG configuration file 830 at step 940. At step 950, the first JSL member that has permission to receive reply emails that are replies to a JSL message is selected. At step 960, reply message 970 is created and addressed to the selected JSG member. At step 980, reply message 970 is sent to the selected JSG member via email server 320 with the JSG member being a member of JSG group 300. A decision is made as to whether there are more JSG members that have sufficient permission to receive reply messages sent in response to a JSG message sent on behalf of the group (decision 990). If there are more members with such permission, then decision 990 branches to the "yes" branch which loops back to select the next JSG member from decrypted JSG configuration file 830 and send the reply to the next selected member as described above. This looping continues until all JSG members with sufficient reply permissions have been sent the reply message, at which point decision 990 branches to the "no" branch whereupon processing returns to the calling routine (see FIG. 4) at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    receiving, at a selected recipient, an email message from one of a plurality of members of a selected joint sender group (JSG), wherein the email message is sent to each of the plurality of members of the selected JSG and includes a signed JSG file;
    validating the received email message using one or more public keys associated with the signed JSG file included with the email message;
    in response to a successful validation by the selected recipient of the received email message, displaying, at the selected recipient, the contents of the email and a JSG name as a name of a sender of the email message;
    in response to receiving a reply request from the selected recipient, identifying a set of members, from the plurality of members of the selected JSG, that are permitted to receive a reply email corresponding to the email message based upon one or more reply permissions stored in the JSG file, wherein the set of members includes fewer members than a number of members in the plurality of members of the selected JSG minus the recipient; and
    sending the reply email corresponding to the reply request to the set of members.

2. The method of claim 1 further comprising:
    inhibiting the sending of the reply email to one or more of the plurality of members that have insufficient reply permissions based upon the JSG file.

3. An information handling system comprising:
    one or more processors;
    a memory coupled to at least one of the processors;
    a network adapter that connects the information handling system to a computer network;
    a set of instructions stored in the memory and executed by at least one of the processors in order to perform actions of:
    receiving, at a selected recipient, an email message from one of a plurality of members of a selected joint sender group (JSG), wherein the email message is sent to each of the plurality of members of the selected JSG and includes a signed JSG file;
    validating the received email message using one or more public keys associated with the signed JSG file included with the email message;
    in response to a successful validation by the selected recipient of the received email message, displaying, at the selected recipient, the contents of the email and a JSG name as a name of a sender of the email message;
    in response to receiving a reply request from the selected recipient, identifying a set of members, from the plurality of members of the selected JSG, that are permitted to receive a reply email corresponding to the email message based upon one or more reply permissions stored in the JSG file, wherein the set of members includes fewer members than a number of members in the plurality of members of the selected JSG minus the recipient; and
    sending the reply email corresponding to the reply request to the set of members.

4. The information handling system of claim 3 wherein the processors perform further actions comprising:
    inhibiting the sending of the reply email to one or more of the plurality of members that have insufficient reply permissions based upon the JSG file.

5. A computer program product stored in a non-transitory computer readable medium, comprising functional descriptive material that, when executed by an information handling system, causes the information handling system to perform actions comprising:
    receiving, at a selected recipient, an email message from one of a plurality of members of a selected joint sender group (JSG), wherein the email message is sent to each of the plurality of members of the selected JSG and includes a signed JSG file;
    validating the received email message using one or more public keys associated with the signed JSG file included with the email message;
    in response to a successful validation by the selected recipient of the received email message, displaying, at the selected recipient, the contents of the email and a JSG name as a name of a sender of the email message;
    in response to receiving a reply request from the selected recipient, identifying a set of members, from the plurality of members of the selected JSG, that are permitted to receive a reply email corresponding to the email message based upon one or more reply permissions stored in the JSG file, wherein the set of members includes fewer members than a number of members in the plurality of members of the selected JSG minus the recipient; and sending the reply email corresponding to the reply request to the set of members.

6. The computer program product of claim 5 wherein the functional descriptive material, when executed by the information handling system, causes the information handling system to perform additional actions comprising:

inhibiting the sending of the reply email to one or more of the plurality of members that have insufficient reply permissions based upon the JSG file.

* * * * *